US 9,228,744 B2

(12) United States Patent
Ergut et al.

(10) Patent No.: US 9,228,744 B2
(45) Date of Patent: Jan. 5, 2016

(54) SYSTEM FOR GASIFICATION FUEL INJECTION

(75) Inventors: Ali Ergut, Houston, TX (US); Shashishekara Sitharamarao Talya, Humble, TX (US); Natesh Chandrashekar, Houston, TX (US); Monty Lee Harned, Houston, TX (US); Judith Pauline Oppenheim, Friendswood, TX (US); Benjamin Campbell Steinhaus, Missouri City, TX (US)

(73) Assignee: General Electric Company, Schenectady, NY (US)

(*) Notice: Subject to any disclaimer, the term of this patent is extended or adjusted under 35 U.S.C. 154(b) by 740 days.

(21) Appl. No.: 13/347,657

(22) Filed: Jan. 10, 2012

(65) Prior Publication Data
US 2013/0175365 A1    Jul. 11, 2013

(51) Int. Cl.
| F23D 11/16 | (2006.01) |
| F23D 14/22 | (2006.01) |
| F23D 17/00 | (2006.01) |
| C10J 3/50  | (2006.01) |
| C10J 3/30  | (2006.01) |

(52) U.S. Cl.
CPC ............... *F23D 14/22* (2013.01); *C10J 3/506* (2013.01); *F23D 17/00* (2013.01); *C10J 3/30* (2013.01); *C10J 2200/152* (2013.01); *C10J 2300/1653* (2013.01); *Y02E 20/16* (2013.01); *Y02E 20/18* (2013.01)

(58) Field of Classification Search
CPC .......... B05B 7/04; B05B 7/0416; B05B 7/10; F05M 51/0653; F05M 51/0621
USPC .......... 239/398, 399, 407, 419.5, 425.5, 494, 239/533.12, 533.14
See application file for complete search history.

(56) References Cited

U.S. PATENT DOCUMENTS

| 3,468,487 | A | | 9/1969 | Warren |
| 3,721,390 | A | * | 3/1973 | Jackson ........................ 239/124 |
| 3,960,504 | A | | 6/1976 | Griffin |
| 4,333,405 | A | | 6/1982 | Michelfelder et al. |
| 4,426,938 | A | | 1/1984 | Leikert et al. |
| 4,436,038 | A | | 3/1984 | Leikert et al. |
| 4,443,228 | A | | 4/1984 | Schlinger |
| 4,466,363 | A | | 8/1984 | Leikert et al. |
| 4,501,206 | A | | 2/1985 | Leikert |

(Continued)

FOREIGN PATENT DOCUMENTS

| CN | 1102246 | 5/1995 |
| CN | 2217192 | 1/1996 |

(Continued)

OTHER PUBLICATIONS

U.S. Appl. No. 12/851,690, filed Aug. 6, 2010, Steven Russell.

(Continued)

*Primary Examiner* — Davis Hwu
(74) *Attorney, Agent, or Firm* — Fletcher Yoder, PC

(57) ABSTRACT

A system includes a gasification fuel injector. The gasification fuel injector includes a mixing device configured to mix together at least two of a solid stream, a liquid stream, or a gaseous stream, or a combination thereof, to generate a mixture. The mixing device is disposed upstream of a tip portion of the gasification fuel injector, and the mixture is discharged from the tip portion.

33 Claims, 4 Drawing Sheets

(56) References Cited

U.S. PATENT DOCUMENTS

| | | | |
|---|---|---|---|
| 4,552,076 A | 11/1985 | McCartney | |
| 4,570,598 A * | 2/1986 | Samson et al. | 123/445 |
| 4,702,180 A | 10/1987 | Kiga | |
| 4,768,446 A | 9/1988 | Wilkes et al. | |
| 4,846,666 A | 7/1989 | Bilawa et al. | |
| 4,885,999 A | 12/1989 | Baba et al. | |
| 5,061,513 A * | 10/1991 | Flynn et al. | 427/585 |
| 5,174,505 A * | 12/1992 | Shen | 239/417.3 |
| 5,365,865 A | 11/1994 | Monro | |
| 5,380,342 A | 1/1995 | Leonard, III et al. | |
| 5,445,325 A * | 8/1995 | White | 239/132.5 |
| 5,450,724 A * | 9/1995 | Kesseli et al. | 60/737 |
| 5,513,583 A | 5/1996 | Battista | |
| 5,656,044 A | 8/1997 | Bishop et al. | |
| 5,685,242 A | 11/1997 | Narato et al. | |
| 5,803,725 A | 9/1998 | Horn et al. | |
| 5,806,443 A | 9/1998 | Kobayashi et al. | |
| 6,116,171 A | 9/2000 | Oota et al. | |
| 6,237,510 B1 | 5/2001 | Tsumura et al. | |
| 6,289,677 B1 | 9/2001 | Prociw et al. | |
| 6,964,696 B2 | 11/2005 | Malatak et al. | |
| 7,229,483 B2 | 6/2007 | Lewis | |
| 7,434,401 B2 | 10/2008 | Hayashi | |
| 8,091,363 B2 * | 1/2012 | Sullivan et al. | 60/748 |
| 2004/0107835 A1 | 6/2004 | Malatak et al. | |
| 2008/0072807 A1 | 3/2008 | Brookes | |
| 2008/0256860 A1 | 10/2008 | Von Kossak-Glowczewski | |
| 2009/0077889 A1 | 3/2009 | Duca et al. | |
| 2009/0077891 A1 | 3/2009 | Duca et al. | |
| 2009/0272822 A1 | 11/2009 | Davis et al. | |
| 2009/0308205 A1 | 12/2009 | Dry | |
| 2010/0115842 A1 | 5/2010 | Raterman | |
| 2010/0146856 A1 | 6/2010 | Zamansky et al. | |
| 2010/0146857 A1 | 6/2010 | Zamansky et al. | |
| 2010/0146858 A1 | 6/2010 | Zamansky et al. | |

FOREIGN PATENT DOCUMENTS

| | | |
|---|---|---|
| CN | 1119723 | 4/1996 |
| CN | 1247290 | 3/2000 |
| CN | 2608844 | 3/2004 |
| CN | 101098750 | 1/2008 |
| CN | 201177258 | 1/2009 |
| CN | 101463257 | 6/2009 |
| CN | 101760245 A | 6/2010 |
| EP | 2199375 A2 | 6/2010 |
| RU | 2174649 | 10/2001 |
| WO | 2009042743 A1 | 4/2009 |
| WO | 2009042744 A1 | 4/2009 |
| WO | 2009116275 | 9/2009 |
| WO | 2009134530 | 11/2009 |
| WO | 2010056334 A2 | 5/2010 |

OTHER PUBLICATIONS

U.S. Appl. No. 12/977,515, filed Dec. 23, 2010, Krishnakumar Venkatesan.

U.S. Appl. No. 13/249,114, filed Sep. 29, 2011, Ali Ergut.

* cited by examiner

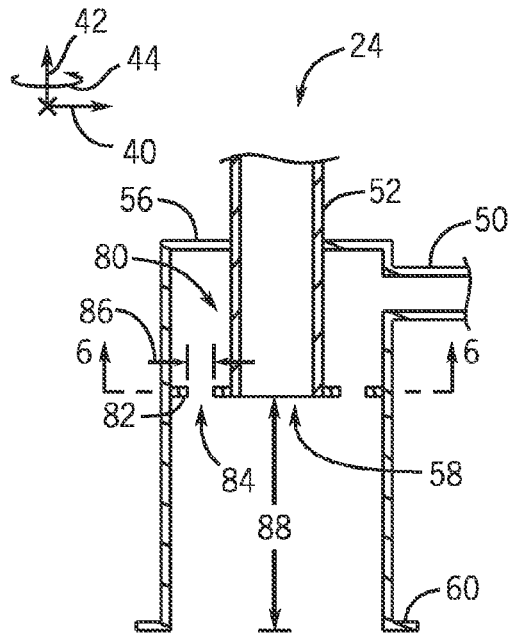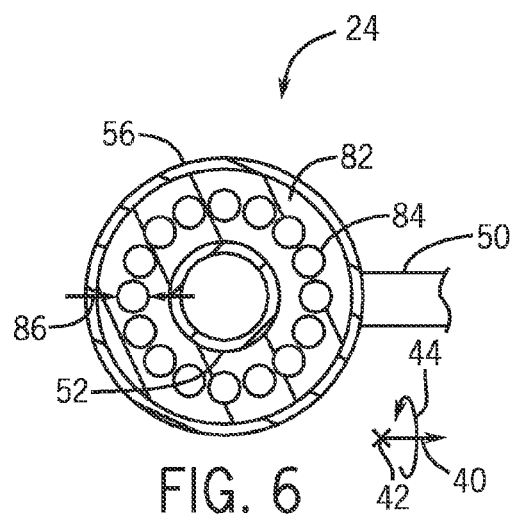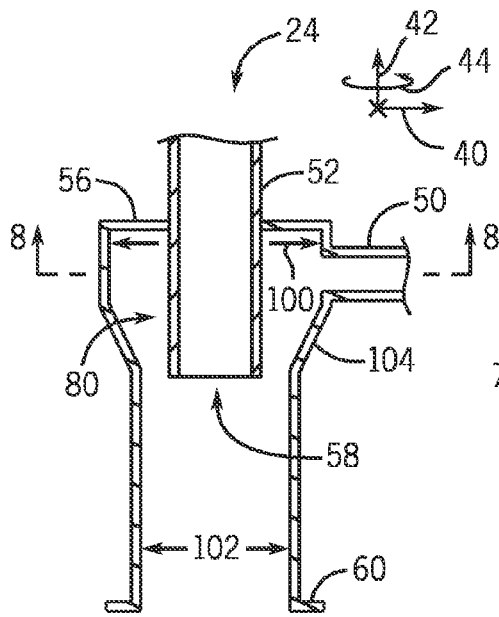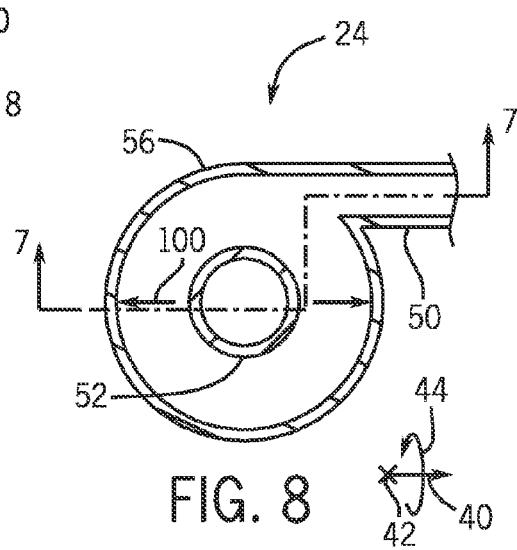
FIG. 5
FIG. 6
FIG. 7
FIG. 8

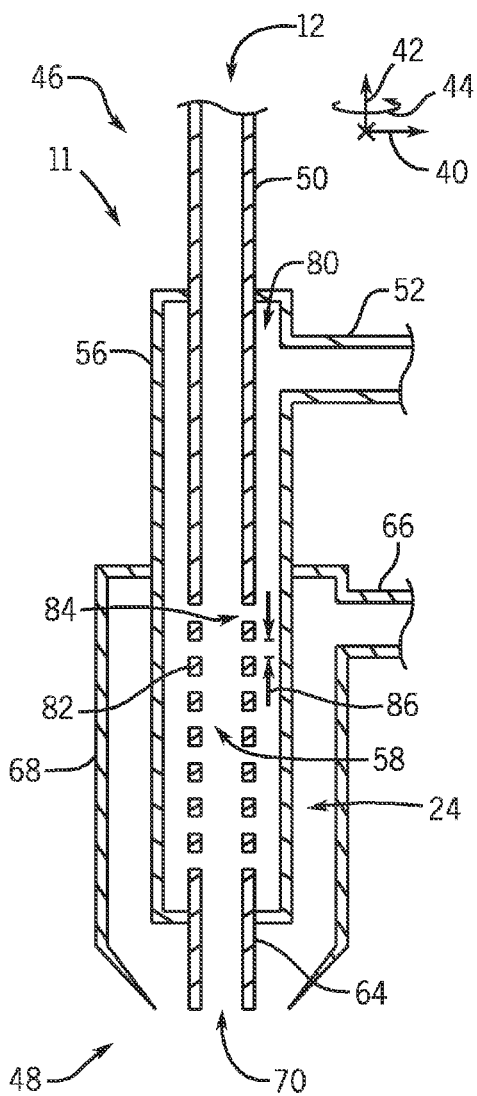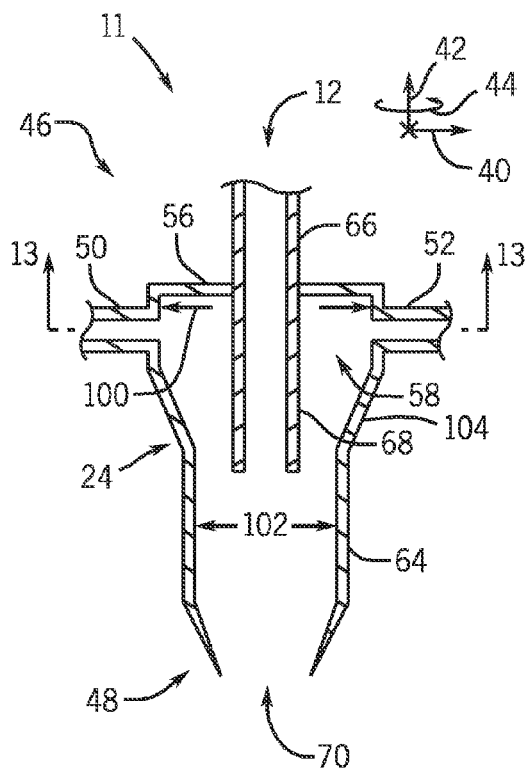
FIG. 11 FIG. 12
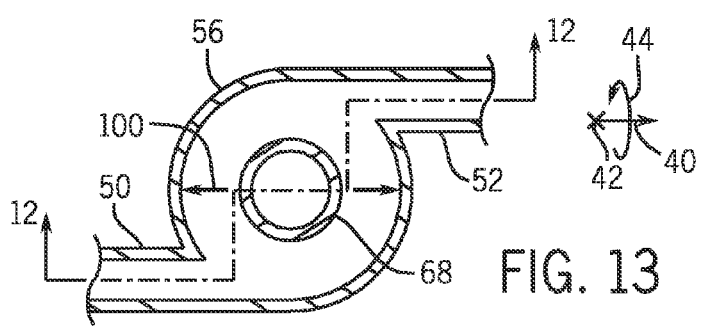
FIG. 13

SYSTEM FOR GASIFICATION FUEL INJECTION

BACKGROUND OF THE INVENTION

The subject matter disclosed herein relates to fuel injectors, and, more particularly, to fuel injectors for gasifiers.

An integrated gasification combined cycle (IGCC) power plant includes a gasifier with one or more fuel injectors. The fuel injectors supply a fuel, such as an organic feedstock, into the gasifier along with oxygen and steam to generate a syngas. However, existing fuel injectors may have several passages for the fuel, oxygen, and other materials injected into the combustion chamber, thereby increasing the complexity and cost of the fuel injectors. In addition, existing fuel injectors may have narrow operating windows and thus, may be replaced when operating conditions for the gasification system change.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification fuel injector. The gasification fuel injector includes a mixing device configured to mix together at least two of a solid stream, a liquid stream, or a gaseous stream, or a combination thereof, to generate a mixture. The mixing device is disposed upstream of a tip portion of the gasification fuel injector, and the mixture is discharged from the tip portion.

In a second embodiment, a system includes a fuel injector. The fuel injector includes a mixing device configured to mix together at least two of a solid stream, a liquid stream, or a gaseous stream, or a combination thereof, to generate a mixture, and a mixture passage coupled to the mixing device. The mixture passage is configured to inject the mixture in a downstream direction. The fuel injector also includes an oxidizer passage configured to inject an oxidizer in the downstream direction. The oxidizer passage is separate from the mixture passage.

In a third embodiment, a system includes a mixing device configured to mix at least two of a solid stream, a liquid stream, or a gaseous stream, or a combination thereof, to form a mixture. The system also includes a fuel injector coupled to the mixing device. The fuel injector includes a tip portion, a mixture passage configured to inject the mixture through the tip portion, and an oxidizer passage configured to inject an oxidizer through the tip portion. The oxidizer passage is separate from the mixture passage.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is an axial cross-section of an embodiment of a mixing device;

FIG. 6 is a radial cross-section of an embodiment of the mixing device of FIGS. 5 and 9, taken along line 6-6;

FIG. 7 is an axial cross-section of an embodiment of a mixing device;

FIG. 8 is an axial cross-section of an embodiment of the mixing device of FIG. 7, taken along line 8-8;

FIG. 11 is an axial cross-section of an embodiment of a fuel injector and a mixing device;

FIG. 12 is an axial cross-section of an embodiment of a fuel injector and a mixing device; and FIG. 13 is a radial cross-section of an embodiment of the mixing device of FIG. 12, taken along line 13-13.

DETAILED DESCRIPTION OF THE INVENTION

Figure 1:
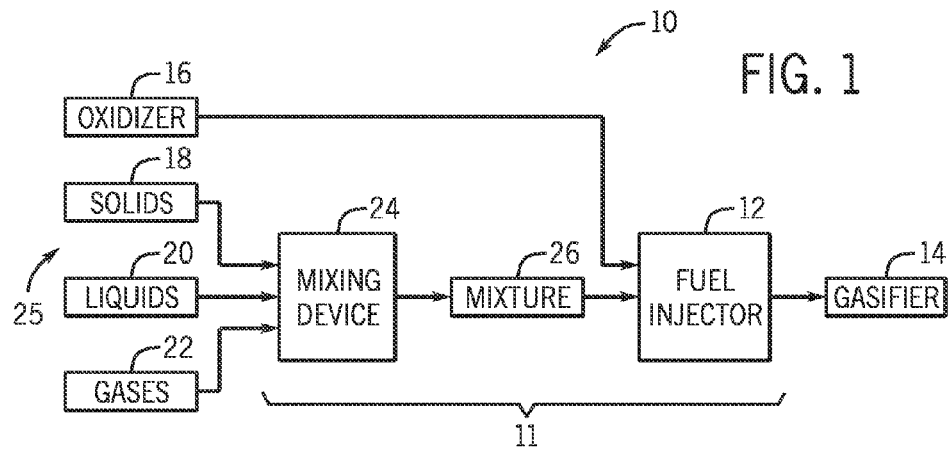
FIG. 1 is a block diagram of an embodiment of an injection system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments incorporate a gasification fuel injector that includes a mixing device configured to mix together at least two of a solid stream, a liquid stream, a gaseous stream, or any combination thereof, to generate a mixture. In certain embodiments, the gasification fuel injector may include a tip portion from which the mixture is discharged. In these embodiments, the mixing device may be disposed upstream of the tip portion. In further embodiments, the fuel injector may include a mixture passage coupled to the mixing device. The mixture passage may inject the mixture in a downstream direction from the fuel injector. The fuel injector may also include an oxidizer passage to inject an oxidizer in the downstream direction. In certain embodiments, the oxidizer passage may be separate from the mixture passage. In other words, the mixture passage may not include the oxidizer. In further embodiments, the fuel injector and the mixing device may be coupled to a reaction chamber.

Using embodiments of fuel injectors and mixing devices may offer several benefits. For example, the number of passages used in the fuel injector may be reduced. Specifically, in certain embodiments, the fuel injector may include only two passages, namely the mixture passage and the oxidizer passage. Such a fuel injector with only two passages may be less costly and less complicated than other fuel injectors with more than two passages. Thus, such embodiments of fuel injectors and mixing devices may be used in a variety of reaction chambers with varying operating conditions. In addition, such embodiments of fuel injectors and mixing devices may provide improved mixing of solid, liquid, or gaseous streams than fuel injectors with several different passages. In other words, the various streams may be well-mixed prior to discharge from the tip portion of embodiments of the fuel injector and mixing device. In addition, mixing occurs close to or within the fuel injector, thereby reducing the potential for the mixed components to separate prior to reaction. Further, such embodiments of fuel injectors and mixing devices may be used to combine or mix streams from three phases, namely, solid, liquid, and gaseous phases.

Turning now to the drawings, FIG. 1 is a block diagram of an embodiment of an injection system 10 having a mixing-equipped injector assembly 11. In the illustrated embodiment, the system 10 includes a fuel injector 12 that injects a fuel and other streams into a gasifier 14. The gasifier 14 is one example of a reaction chamber that may use the fuel injector 12, as discussed in detail below. The gasifier 12 may convert a feedstock into a syngas, e.g., a combination of carbon monoxide, hydrogen, methane, and/or other products. In other embodiments, the fuel injector 12 may be disposed in similar devices, such as, but not limited to, a gas turbine engine, a combustion engine, a combustion system, a boiler, a reactor, a combustor, or any combination thereof.

Examples of streams that may be fed to the fuel injector 12 include, but are not limited to, an oxidizer stream 16, a solid stream 18, a liquid stream 20, a gaseous stream 22, or any combination thereof. For example, the oxidizer stream 16 may include, but is not limited to, oxygen, air, steam, oxygen mixtures, or any combination thereof. The solid stream 18 may include, but is not limited to, solid carbonaceous fuel (e.g., coal or biofuel), other solid fuel, recycled solids, slag additives, or any combination thereof. In certain embodiments, a coating may be disposed on an interior surface of a mixing device 24 to help reduce or inhibit erosion and/or corrosion of the interior surface caused by the flow of the solid stream 18 or combined streams that include the solid stream 18. For example, the coating may be a ceramic coating. The liquid stream 20 may include, but is not limited to, water, liquid moderator, liquid reactant, fuel, a slurry of solid fuel, recycle solids, slag additives, or any combination thereof with water, or any combination of the above mentioned liquids. The gaseous stream 22 may include, but is not limited to, gaseous moderator, gaseous reactant, gaseous catalyst, or any combination thereof. Examples of such gases include, but are not limited to, nitrogen, carbon dioxide, steam, gas fuel, air, and so forth.

The lines and other equipment located upstream of the mixing device 24 that convey the streams 18, 20, and 22 to the mixing device 24 may collectively be referred to as a conveyance section 25. The conveyance section 25 may convey the streams 18, 20, and 22 separately to the mixing device 24. In other words, no mixing of the streams 18, 20, and 22 may occur upstream of the mixing device 24. In certain embodiments, the mixing device 24 may be used to mix together three phases, namely the solid stream 18, the liquid stream 20, and the gaseous stream 22. In other embodiments, the mixing device 24 may be used to mix together two phases. In further embodiments, the mixing device 24 may be used to mix together two or more streams of the same phase, such as two solid phases, two liquid phases, or two gaseous phases. In yet further embodiments, some of the streams mixed by the mixing device 24 may include a mixture of two or more phases. As shown in FIG. 1, the oxidizer stream 16 is fed directly to the fuel injector 12. The solid stream 18, the liquid stream 20, and the gaseous stream 22 are fed to a mixing device 24 to generate a mixture 26. As shown in FIG. 1, the mixture 26 is then fed to the fuel injector 12, which discharges the oxidizer stream 16 and the mixture 26 into the gasifier 14. Although the mixing device 24 is shown separate from the fuel injector 12 in FIG. 1, in certain embodiments, the mixing device 24 may be directly coupled to the fuel injector 12 or disposed in (e.g., integral with) the fuel injector 12.

Figure 2:
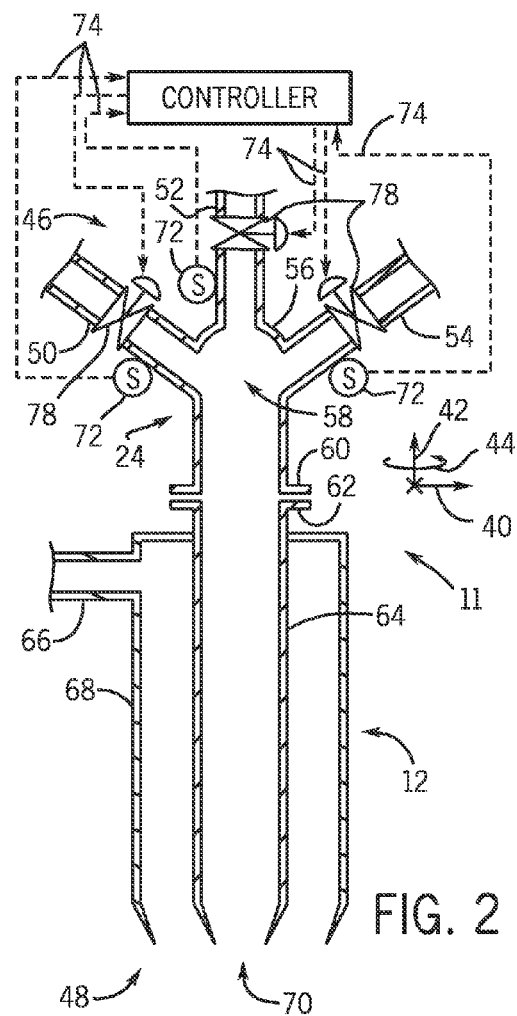
FIG. 2 is an axial cross-section of an embodiment of a fuel injector coupled to a mixing device.

FIG. 2 is an axial cross-section of the fuel injector 12 and the mixing device 24 (i.e., the injector assembly 11) in accordance with an embodiment. In the following discussion, reference may be made to a radial direction or axis 40, an axial direction or axis 42, and a circumferential direction or axis 44 (e.g., around axis 42). The fuel injector 12 has an upstream side or portion 46, from which the feedstock, oxygen, and other materials may originate. The fuel injector 12 also has a downstream side or portion 48, where the feedstock, oxygen, and other materials may exit. As shown in FIG. 2, the mixing device 24 is directly coupled to the upstream side 46 of the fuel injector 12. The mixing device 24 may include a first nozzle 50, a second nozzle 52, and a third nozzle 54. In other embodiments, the mixing device 24 may include fewer or more nozzles than those shown in FIG. 2. Each of the nozzles 50, 52, and 54 may convey different streams to the fuel injector 12. For example, the first nozzle 50 may convey the solid stream 18, the second nozzle 52 may convey the liquid stream 20, and the third nozzle 54 may convey the gaseous stream 22. In other embodiments, nozzles 50, 52, and 54 may convey any number of solid streams 18, liquid streams 20, or gaseous streams 22. For example, nozzles 50 and 52 may convey two different liquid streams 20, and nozzle 54 may convey the gaseous stream 22. In further embodiments, the mixing device 24 may include fewer or more nozzles than the three shown in FIG. 2. In addition, any one of the nozzles 50, 52, or 54 may convey a mixture of any of the solid stream 18, liquid stream 20, or gaseous stream 22. For example, any of the nozzles 50, 52, or 54 may convey a coal and water slurry, or any other slurry of the solid stream 18 and the liquid stream 20. The preceding comments regarding nozzles 50, 52, and 54 also apply to other embodiments of the injector assembly 11 discussed below. As shown in FIG. 2, each of the nozzles 50, 52, and 54 may be coupled to a head 56 of the mixing device 24. Within the head 56, the mixing device 24 includes a mixing chamber 58 where the streams from each of the nozzles 50, 52, and 54 may combine and mix with one another. In other words, the streams conveyed by the nozzles 50, 52, or 54 converge and impinge against one another in the mixing chamber 58 to help provide adequate mixing of the streams. In addition, the mixing chamber 58 may be configured such that the various streams mix effectively with minimal pressure drop while the mechanical integrity of the mixing chamber 58 is protected, e.g., erosion and corrosion are minimized.

As shown in FIG. 2, the mixing device 24 may include a first flange 60 that is configured to mate with a second flange 62 of the fuel injector 12. The first and second flanges 60 and 62 may be removably or fixedly coupled together via bolts, welds, brazing, adhesives, clamps, threads, or any combination thereof. In other embodiments, the mixing device 24 and the fuel injector 12 may be a one-piece body, e.g., integrally formed together as a single continuous structure. As shown in FIG. 2, the mixing device 24 may be coupled to a mixture passage 64 of the fuel injector 12. The mixture passage 64 may convey the mixture 26 to the downstream side 48 and the mixture passage 64 may be configured to help reduce or prevent phase separation. The fuel injector 12 may also include an oxidizer nozzle 66 and an oxidizer passage 68. As shown in FIG. 2, the oxidizer passage 68 may surround the mixture passage 64. In certain embodiments, the oxidizer passage 68 may be concentric with the mixture passage 64. In further embodiments, the mixture passage 64 and the oxidizer passage 68 may be annular passages. In yet further embodiments, the mixture passage 64 and the oxidizer passage 68 may be arranged side-by-side one another. As shown in FIG. 2, the mixture passage 64 and the oxidizer passage 68 discharge the mixture 26 and the oxidizer stream 16 at a tip portion 70 of the fuel injector 12. Thus, the fuel and oxidizer may react, burn, or combust downstream of the tip portion 70.

Use of a removably coupled mixing device 24 to the fuel injector 12 may offer several benefits. For example, the complexity of the fuel injector 12 may be reduced compared to other fuel injectors with many passages. For example, the fuel injector may include only two passages, namely the mixture passage 64 and the oxidizer passage 68. Instead of modifying the fuel injector 12 to accommodate changes in the number, amount, or composition of materials conveyed, the mixing device 24 may be uncoupled from the fuel injector 12 and replaced with one of several different configurations of mixing devices 24 with specific characteristics for different situations. In addition, replacement of the fuel injector 12 may be easily performed without having to also remove the mixing device 24. Thus, a removably coupled mixing device 24 provides modularity and interchangeability to the injector assembly 11. Such modularity may provide significant cost savings compared to complete replacement or modification of the entire injector assembly 11.

In the illustrated embodiment of FIG. 2, one or more sensors 72 may be disposed in the injector assembly 11 (e.g., in the mixing device 24 and/or the fuel injector 12). For example, sensors 72 may be disposed on the nozzles 50, 52, and 54 to measure flow rates of the material flowing through the nozzles. The sensors 72 may send signals 74 to a controller 76, which may in turn send signals 74 to one or more flow devices 78 disposed in the nozzles 50, 52, and 54 or along the lines upstream of the nozzles. In certain embodiments, the flow devices 78 may be valves used to adjust or control individual flow rates of the material flowing through the nozzles 50, 52, and 54 to optimize mixing and flow characteristics of the mixture 26, for example. Based on the signals 74 received by the controller 76 from the sensors 72, the controller 76 may direct the valves 78 to open or close accordingly. For example, if one of the sensors 72 indicates that a flow rate is below a threshold, the controller 76 may direct one of the valves 78 to open further. Similarly, if one of the sensors 72 indicates that a flow rate is above a threshold, the controller 76 may direct one of the valves 78 to close additionally. In further embodiments, the flow devices 78 may be used as backflow prevention devices. Specifically, if one of the sensors 72 indicates reverse flow (e.g., negative flow, flow toward the upstream side 46, or low pressure), the controller 76 may send a signal 74 to direct the appropriate valve 78 to close completely or to open further to generate a positive flow depending on the desired process conditions. Thus, the valve 78 may help block undesired mixing of the materials flowing through the nozzles 50, 52, and 54. In other embodiments, the flow device 78 may be a check valve or other device to help block backflow through the mixing device 24. The controller 76 and flow devices 78 may be used with any of the embodiments described below. In addition, the controller 76 may be used to control the flow during transient operation, e.g., start-up, shutdown, or turndown of the system during which compressible streams may be substituted with non-compressible liquid streams to help prevent backflow.

Figure 3:
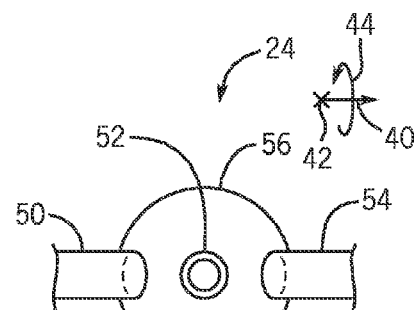
FIG. 3 is a top view of an embodiment of a mixing device.
Figure 4:
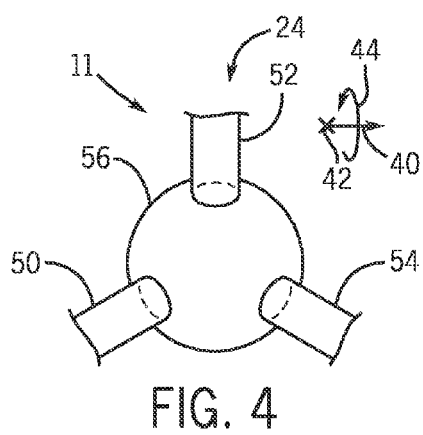
FIG. 4 is a top view of an embodiment of a mixing device.

FIG. 3 is a top view of an embodiment of the mixing device 24 of the injector assembly 11. As shown in FIG. 3, the first nozzle 50 and the third nozzle 54 are coupled to the head 56 of the mixing device 24 near an edge of the head 56. Thus, the streams conveyed by the nozzles 50, 52, and 54 converge and impinge on one another to facilitate mixing of the streams. For example, such an arrangement of the nozzles 50, 52, and 54 may help to break up clumps in the streams, e.g., clumps within the liquid stream 20 or the solid stream 18. In addition, such an arrangement of the nozzles 50, 52, and 54 may help provide atomization of the streams. The second nozzle 52 is coupled near a center of the head 56. Such a linear arrangement of the nozzles 50, 52, and 54 may help to take up less room. In other embodiments, the first, second, and third nozzles 50, 52, and 54 may be coupled to the mixing device 24 in other arrangements. For example, FIG. 4 shows a top view of the mixing device 24 with a different arrangement of the first, second and third nozzles 50, 52, and 54. Specifically, the nozzles 50, 52, and 54 are all coupled near the edge of the head 56 and spaced approximately equidistant from one another, e.g., approximately 120 degrees apart from one another about axis 42. The arrangement of the nozzles 50, 52, and 54 shown in FIG. 4 may help the streams conveyed by the nozzles 50, 52, and 54 to converge and impinge against one another to facilitate mixing of the streams. In certain embodiments, the nozzles 50, 52, and 54 may be arranged at an angle to the axial axis 42, which may impart a swirling motion to the mixture, thereby improving mixing. In other embodiments, the nozzles 50, 52, and 54 may be attached tangentially to the head 56, which may also impart a swirling motion to the mixture.

FIG. 5 is an axial cross-sectional view of an embodiment of the mixing device 24. The fuel injector 12 is not shown in FIG. 5 for clarity. However, it is understood that the mixing device 24 shown in FIG. 5 may be directly coupled to the fuel injector 12 using the first flange 60 or be one piece with the injector 12. As shown in FIG. 5, the first nozzle 50 is coupled to a lateral side of the mixing device 24. Thus, the material flowing through the first nozzle 50 may be introduced normal (e.g., the radial direction 40) to the axial axis 42. The second nozzle 52 may be coupled to the head 56 of the mixing device 24. As shown in FIG. 5, the second nozzle 52 may extend at least partially into the mixing chamber 58 of the mixing device 24, thereby creating a turbulence zone 80 for the material from the first nozzle 50. The turbulence zone 80 may provide room for components of the material from the first nozzle 50 to mix with one another additionally or break up solid chunks in the flow. A perforated plate 82 may be coupled to the inner surface of the mixing device 24 and the second nozzle 52 to define the turbulence zone 80. As shown in FIG. 5, the perforated plate 82 is perpendicular to the axial axis 42. A plurality of openings 84 may be formed in the perforated plate 82 to enable the material from first nozzle 50 to exit from the turbulence zone 80 into the mixing chamber 58. Each of the openings 84 may be defined by a width or diameter 86, which may be selected to provide a certain velocity of the material flowing from the first nozzle 50 into the mixing chamber 58. For example, smaller openings 84 may increase the velocity of the material from the first nozzle 50. In certain embodiments, the openings 84 may be arranged at an angle to a flow axis of the material from the first nozzle 50, which may cause the material from the first nozzle 50 to impinge or swirl against the material from the second nozzle 52, thereby improving mixing of the mixture. In other embodiments, the openings may be arranged at an angle to a flow axis of any of the streams. As the material from the first nozzle 50 exits through the openings 84, the material may combine and mix with the material from the second nozzle 52 and enter the fuel injector 12 as the mixture 26. In addition, the sudden expansion of the material from the first nozzle 50 into the mixing chamber 58 may enhance mixing. A distance 88 from the second nozzle 52 to the first flange 60 of the mixing device 24 may be selected to provide sufficient room for mixing prior to the mixture 26 entering the fuel injector 12.

FIG. 6 is radial cross-sectional view of the mixing device 24 along the line labeled 6-6 in FIG. 5. Specifically, the cross-sectional view of FIG. 6 is through the perforated plate 82. In the illustrated embodiment, the openings 84 have circular shapes and are arranged in a ring about the perforated plate 82. In other embodiments, the openings 84 may be arranged in one or more rings, one around another. In further embodiments, the openings 84 may have other cross-sectional shapes, such as, but not limited to, square, oval, triangular, polygonal, or other cross-sectional shapes. In addition, the openings 84 may be arranged in other patterns in further embodiments. Moreover, not all the openings 84 may be the same. For example, the openings 84 may have different shapes and/or sizes from one another.

FIG. 7 is an axial cross-sectional view of the mixing device 24. The first nozzle 50 is coupled to the mixing device tangentially, which may be more apparent in FIG. 8 as discussed in further detail below. Thus, the material introduced into the mixing device 24 by the first nozzle 50 may flow though the mixing device 24 with a swirling motion about the axis 42. In addition, as shown in FIG. 7, the head 56 of the mixing device 24 has a first diameter 100 greater than a second diameter 102 of the mixing device 24 near the first flange 60. The larger first diameter 100 of the head 56 may enable the material from the first nozzle 50 to acquire more of a swirling motion prior to combining with the material from the second nozzle 52 in the mixing chamber 58. In certain embodiments, the mixing device 24 may have a conical wall 104 joining together the portions of the mixing device 24 with first and second diameters 100 and 102. The conical wall 104 may direct the swirling material from the first nozzle 50 toward the material from the second nozzle 52, thereby helping to provide adequate mixing of the materials. In addition, the converging, or gradually decreasing, flow area of the passage encompassed by the conical wall 104 may increase the velocity of the material flowing into the mixing chamber 58, thereby providing additional mixing. Thus, the combined effect of the swirling motion and increased flow velocity may increase the mixing of the materials from the first and second nozzles 50 and 52.

FIG. 8 is a radial cross-sectional view of the mixing device 24 along the line labeled 8-8 in FIG. 7. Specifically, the cross-sectional view is through the portion of the mixing device 24 with the first diameter 100. As shown in FIG. 8, the first nozzle 50 is coupled to the mixing device 24 tangentially. Thus, the tangential arrangement of the first nozzle 50 imparts a swirling motion (in the circumferential direction 44) to the material flowing through the first nozzle 50. This swirling motion of the material from the first nozzle 50 may provide for better mixing of the materials within the mixing device 24. In further embodiments, the mixing device 24 may include two or more tangential nozzles to mix together additional streams. The tangential nozzles may produce swirling motion in the same directions or in opposite directions to provide even further mixing of materials.

Figure 9:
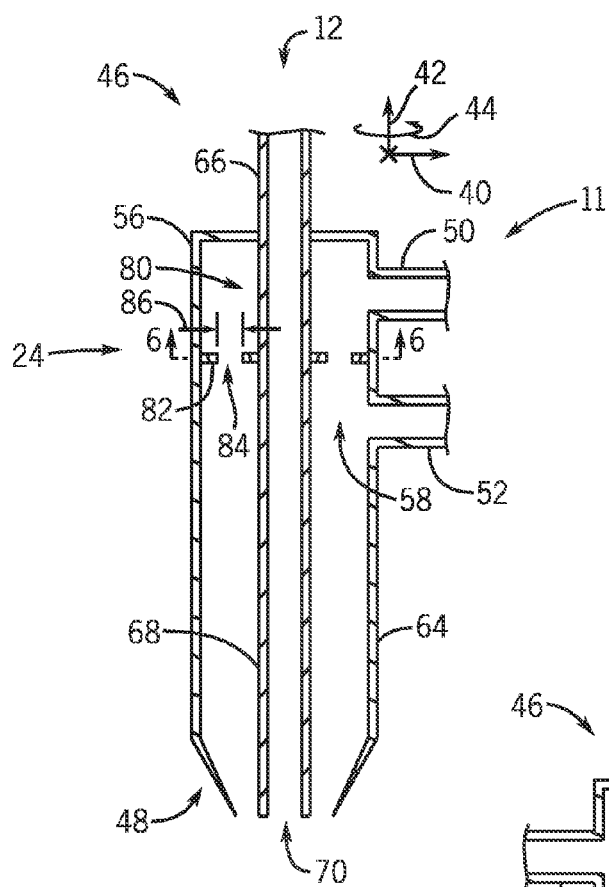
FIG. 9 is an axial cross-section on an embodiment of a fuel injector and a mixing device.

FIG. 9 is an axial cross-sectional view of the injector assembly 11 having the mixing device 24 disposed within the fuel injector 12. In other words, the mixing device 24 is part of (or integrated with) the fuel injector 12. Specifically, the first and second nozzles 50 and 52 are coupled to the mixture passage 64. The first nozzle 50 conveys material into the turbulence zone 80 adjacent to the head 56 of the mixing device 24. The perforated plate 82 may be disposed within the mixture passage 64 and coupled to the mixture passage 64 and the oxidizer passage 68. As shown in FIG. 9, the perforated plate 82 is perpendicular to the axial axis 42. The perforated plate 82 enables the material from the first nozzle 50 to flow through the opening 84 into the mixing chamber 58. The material from the second nozzle 52 enters the mixing chamber 58 and mixes with the material from the first nozzle 50 as the mixture 26 flows in the downstream direction 48 through the mixture passage 64 toward the tip 70 of the fuel injector 12. In addition, the sudden expansion of the material from the first nozzle 50 into the mixing chamber 58 may enhance mixing. In one embodiment, the solid stream 18 may flow through the first nozzle 50 and the liquid stream 20 through the second nozzle 52. The perforated plate 82 may help break up any chunks in the solid stream 18 prior to mixing with the liquid stream 20. In addition, the oxidizer nozzle 66 may be coupled to the head 56 enabling the oxidizer passage 68 to pass through the middle of the fuel injector 12 and terminate near the tip 70. Thus, the mixture 26 and oxidizer mix at the tip 70. In other words, the oxidizer is kept separate from the materials from the first and second nozzles 50 and 52 until reaching the tip 70, thereby helping to block any undesirable reaction within the fuel injector 12. In other embodiments, the oxidizer passage 68 may be at least partially retractable to provide for additional mixing near the tip 70.

Figure 10:
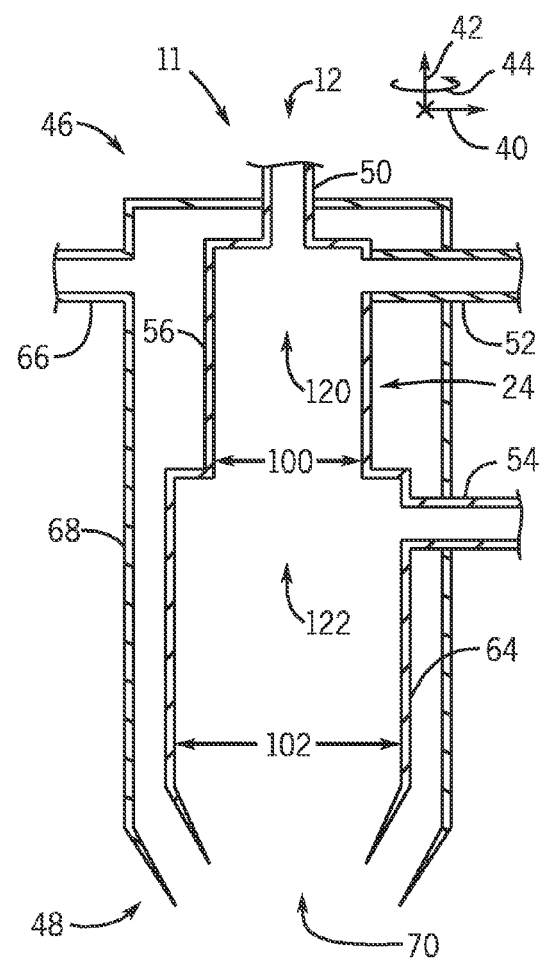
FIG. 10 is an axial cross-section of an embodiment of a fuel injector and a mixing device.

FIG. 10 is an axial cross-sectional view of the injector assembly 11 with the mixing device 24 disposed within the fuel injector 12. In the illustrated embodiment, the first, second, and third nozzles 50, 52, and 54 pass through the oxidizer passage 68 to be coupled to the mixture passage 64. Specifically, the first nozzle 50 passes axially through a top of the oxidizer passage 68 and the second and third nozzles 52 and 54 pass radially through a side of the oxidizer passage 68. The first and second nozzles 50 and 52 carry material into a first mixing zone 120 (or expansion chamber) disposed near the head 56 of the mixing device 24. The flows from first and second nozzles 50 and 52 may converge or impinge against one another to enhance mixing. The third nozzle 54 carries material into a second mixing zone 122 (or expansion chamber) disposed downstream of the first mixing zone 120. Again, the flows from first mixing zone 120 and nozzle 54 may converge or impinge against one another to enhance mixing. The first diameter 100 of the first mixing zone 120 may be less than the second diameter 102 of the second mixing zone 122. The larger second diameter 102 may enable a velocity of the larger amount of material flowing through the second mixing zone 122 to be approximately the same as a velocity of the smaller amount of material flowing through the first mixing zone 120. The first and second diameters 100 and 102 may also be adjusted to control the flow velocity through the mixing device 24 in other ways. In addition, the expansion in the second mixing zone 122 and introduction of additional material may help enhance mixing. In further embodiments, one or both of the nozzles 52 and 54 may coupled tangentially to the mixing device 24 to impart swirling motion in the same direction or opposite directions to the materials. After the materials flowing through the mixture passage 64 are thoroughly mixed, the mixture 26 may be ejected near the tip 70 of the fuel injector 12 and combined with the oxidizer stream 16 flowing through the oxidizer passage 68.

FIG. 11 is an axial cross-sectional view of an embodiment of the injector assembly 11 with a portion of the mixing device 24 disposed within the fuel injector 12. The second nozzle 52 may carry material radially into the turbulence zone 80 disposed near the head 56 of the mixing device 24. In certain embodiments, the second nozzle 52 may coupled tangentially to the mixing device 24 to impart swirling motion to the materials. In addition, the material from the second nozzle 52 may pass through openings 84 of the perforated plate 82, which is configured as a perforated cylindrical tube or annular pipe. Material from the first nozzle 50 may combine with the material from the second nozzle 52 in the mixing chamber 58. In the illustrated embodiment, the perforated plate 82 is oriented parallel to the axial axis 42 of the fuel injector 12. In other words, the material flowing from the second nozzle 52 flows in the radial direction 40 through the openings 84 to combine with the material flowing from the first nozzle 50 in the axial direction 42. The movement of the materials from the first and second nozzles 50 and 52 crosswise (e.g., perpendicular) may help improve mixing of the mixture 26. The mixture 26 of the materials from the first and second nozzles 50 and 52 may be discharged from the mixing passage 64 near the tip 70 to be combined with the oxidizer stream 16 flowing through the oxidizer passage 68. In addition, if the material flowing from the first nozzle 50 is a liquid and the material flowing from second nozzle 52 is a gas, the mixing in the mixing chamber 58 may cause instabilities in the liquid flow and may improve atomization of the liquid further downstream, for example when the liquid-gas mixture mixes with the oxidizer stream 16 near the tip portion 70.

FIG. 12 is an axial cross-sectional view of an embodiment of the injector assembly 11 with the mixing device 24 disposed within the fuel injector 12. Specifically, the mixture passage 64 surrounds the oxidizer passage 68 in a coaxial arrangement. The first and second nozzles 50 and 52 are coupled to the head 56 of the mixing device 24 in a tangential arrangement, which may be more apparent in FIG. 13. The materials flowing through the first and second nozzles 50 and 52 combine in the mixing chamber 58 with swirling motion and combine with the oxidizer stream 16 from the oxidizer passage 68 before being discharged from the tip portion 70 of the fuel injector 12. As shown in FIG. 12, the first diameter 100 of the mixing passage 64 is greater than the second diameter 102 of the mixture passage 64. The greater first diameter 100 may provide additional room for the materials from the first and second nozzles 50 and 52 to mix to form the mixture 26 prior to combining with the oxidizer stream 16. In addition, the flow velocity of the materials may increase moving through the converging, or decreasing flow area, encompassed by the conical wall 104, thereby enhancing mixing.

FIG. 13 is a radial cross-sectional view of the injector assembly 11 along the line labeled 13-13 in FIG. 12. As shown in FIG. 13, the first and second nozzles 50 and 52 are coupled to the head 56 tangentially. Thus, the arrangement of the first and second nozzles 50 and 52 may impart a swirling motion in the circumferential direction 44 to the materials flowing through the mixture passage 64. Such a swirling motion may improve the mixing of the materials from the first and second nozzles 50 and 52 prior to mixing with the oxidizer stream 16 from the oxidizer passage 68. In other embodiments, the first and second nozzles 50 and 52 may be arranged to impart counter-swirl motion to the materials. In other words, the arrangement of the nozzles 50 and 52 may cause the materials to swirl in opposite directions from one another.

As described above, certain embodiments of the fuel injector 12 may include the mixing device 24 to mix together at least two of the solid stream 18, the liquid stream 20, the gaseous stream 22, or a combination thereof, to generate the mixture 26. The mixing device 24 may be disposed upstream of the tip 70 of the fuel injector 12, and the mixture 26 may be discharged from the tip 70. In certain embodiments, the mixture passage 64 may be coupled to the mixing device 24 and the mixture passage 64 may inject the mixture 26 in the downstream direction 48. In addition, the fuel injector 12 may include the oxidizer passage 68 to inject the oxidizer stream 16 in the downstream direction 48. In various embodiments, the oxidizer passage 68 is separate from the mixture passage 64. In other words, the oxidizer stream 16 may not mix or combine with the mixture 26 prior to the tip 70. In further embodiments, the fuel injector 12 that includes the mixing device 24 may be coupled to the gasifier 14 to inject the mixture 26 and the oxidizer stream 16 to be reacted within the gasifier 14. By using the mixing device 24, the fuel injector 12 may be simplified. Specifically, the mixing device 24 may be used to combine the various materials injected by the fuel injector without the use of separate passages within the fuel injector 12. In addition, the mixing device 24 may provide for better mixing of the non-oxidizer materials, thereby providing for more homogeneous reaction within the gasifier 14. Further, in certain embodiments, the mixing device 24 may be used to combine two or three phases, specifically, the solid stream 18, the liquid stream 20, and the gaseous stream 22. Further, in the embodiment in which the mixing device 24 is coupled to the fuel injector 12, the mixing device 24 may be easily removed for maintenance or repair using the first and second flanges 60 and 62.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a gasification fuel injector, comprising:
a mixing device comprising a first inlet configured to receive a first substance, a second inlet configured to receive a second substance, and a third inlet configured to receive a third substance, wherein the first, second, and third substances are different from one another, wherein the first, second, and third inlets are independently coupled to a common mixing chamber of the mixing device, wherein the mixing device is configured to mix together the first, second, and third substances to generate a mixture including a gasification feedstock and excluding an oxidizer;
a mixture passage coupled to the mixing device, wherein the mixture passage comprises a first outlet configured to inject the mixture in a downstream direction; and
an oxidizer passage comprising a second outlet configured to inject the oxidizer in the downstream direction, wherein the oxidizer passage is separate from the mixture passage, and the first and second outlets are downstream from the mixing device.
2. The system of claim 1, wherein the mixing device is disposed in the gasification fuel injector.

3. The system of claim 1, wherein the mixing device is coupled to an upstream portion of the gasification fuel injector.

4. The system of claim 1, wherein the mixing device comprises a first flange coupled to a second flange of the mixture passage.

5. The system of claim 1, wherein the mixing device comprises an annular wall disposed about the common mixing chamber, and the first, second, and third inlets are oriented crosswise to an axis of the mixing device.

6. The system of claim 1, wherein at least one of the first, second, or third inlets is coupled to the common mixing chamber tangentially to induce a swirling.

7. The system of claim 1, wherein the common mixing chamber comprises a diameter larger than the first, second, and third inlets.

8. The system of claim 1, wherein the common mixing chamber comprises a perforated mixing plate disposed between the first and second inlets.

9. The system of claim 8, wherein the perforated mixing plate is parallel to an axial axis of the gasification fuel injector.

10. The system of claim 8, wherein the perforated mixing plate is crosswise to an axial axis of the gasification fuel injector.

11. The system of claim 8, wherein the perforated mixing plate comprises a plurality of holes oriented at an angle to induce a swirling flow.

12. The system of claim 1, comprising a first nozzle having the first inlet, wherein the first nozzle protrudes a distance into the common mixing chamber.

13. The system of claim 12, wherein the second inlet is coupled to the common mixing chamber upstream from a downstream end of the first nozzle.

14. The system of claim 13, wherein the third inlet is coupled to the common mixing chamber upstream from the downstream end of the first nozzle.

15. A system, comprising:
a fuel injector, comprising:
a mixing device comprising a first inlet configured to receive a first substance, a second inlet configured to receive a second substance, and a third inlet configured to receive a third substance, wherein the first, second, and third substances are different from one another, wherein the first, second, and third inlets are independently coupled to a common mixing chamber of the mixing device, wherein the mixing device is configured to mix together the first, second, and third substances in the common mixing chamber to generate a mixture including a feedstock and excluding an oxidizer;
a mixture passage coupled to the mixing device, wherein the mixture passage comprises a first outlet configured to inject the mixture in a downstream direction; and
an oxidizer passage comprising a second outlet configured to inject the oxidizer in the downstream direction, wherein the oxidizer passage is separate from the mixture passage, and the second outlet is downstream from the mixing device.

16. The system of claim 15, wherein each of the first, second, and third inlets expand into the common mixing chamber.

17. The system of claim 15, comprising a controller configured to control a flow of the first, second, and third substances and the oxidizer, wherein the first, second, and third substances comprise at least one of the feedstock, a moderator, or an additive.

18. A system, comprising:
a mixing device having first and second inlets that expand into a mixing chamber, wherein the mixing chamber expands in a downstream direction, the first inlet is configured to receive a first substance, the second inlet is configured to receive a second substance different from the first substance, the mixing chamber is configured to mix together the first and second substances to generate a mixture including a feedstock and excluding an oxidizer; and
a fuel injector coupled to the mixing device, wherein the fuel injector comprises:
a tip portion;
a mixture passage comprising a first outlet configured to inject the mixture through the tip portion; and
an oxidizer passage comprising a second outlet configured to inject the oxidizer through the tip portion, wherein the oxidizer passage is separate from the mixture passage, and the second outlet is downstream from the mixing device.

19. The system of claim 18, comprising a controller configured to control flows of the first substance, the second substance, and the oxidizer, wherein the first and second substances comprise at least one of the feedstock, a moderator, or an additive.

20. The system of claim 18, wherein the mixing device has a third inlet that expands into the mixing chamber, wherein the first, second, and third inlets are independently coupled to the mixing chamber.

21. The system of claim 5, wherein the common mixing chamber comprises a first portion with a first cross-sectional area and a second portion with a second cross-sectional area smaller than the first cross-sectional area, the first inlet is coupled to the first portion, and the second inlet is coupled to the second portion.

22. The system of claim 1, wherein the gasification fuel injector is configured to couple to an exterior of a gasifier, and the mixing device is configured to be disposed outside of the exterior of the gasifier.

23. The system of claim 22, comprising the gasifier having the gasification fuel injector coupled to the exterior of the gasifier.

24. The system of claim 1, comprising a first nozzle having the first inlet, a second nozzle having the second inlet, and a third nozzle having the third inlet, wherein the first, second, and third nozzles are oriented in a converging relationship.

25. The system of claim 1, wherein the second inlet is coupled to the common mixing chamber downstream from the first inlet, and the third inlet is coupled to common the mixing chamber downstream from the first and second inlets.

26. The system of claim 1, wherein the mixture passage and the oxidizer passage are concentric with one another.

27. The system of claim 1, wherein the mixture passage is disposed circumferentially around the oxidizer passage.

28. The system of claim 1, wherein the oxidizer passage is disposed circumferentially around the mixture passage.

29. The system of claim 1, wherein the first and second outlets are disposed in a tip portion of the gasification fuel injector.

30. The system of claim 15, wherein the fuel injector is configured to couple to an exterior of a gasifier, and the mixing device is configured to be disposed outside of the exterior of the gasifier.

31. The system of claim 15, wherein the mixing chamber expands in the downstream direction.

32. The system of claim 18, wherein the first and second inlets are independently coupled to the mixing chamber of the mixing device.

33. The system of claim 18, wherein the fuel injector is configured to couple to an exterior of a gasifier, and the mixing device is configured to be disposed outside of the exterior of the gasifier.

\* \* \* \* \*